(12) United States Patent
Micout

(10) Patent No.: US 10,906,219 B2
(45) Date of Patent: Feb. 2, 2021

(54) METHOD FOR PRODUCING A SEALING ELEMENT

(71) Applicant: CQLT SAARGUMMI TECHNOLOGIES S.À.R.L., Remich (LU)

(72) Inventor: Vincent Micout, Losheim (DE)

(73) Assignee: CQLT SAARGUMMI TECHNOLOGIES S.À.R.L., Remich (LI)

( * ) Notice: Subject to any disclaimer, the term of this patent is extended or adjusted under 35 U.S.C. 154(b) by 168 days.

(21) Appl. No.: 16/079,717

(22) PCT Filed: Jan. 9, 2017

(86) PCT No.: PCT/EP2017/000017
§ 371 (c)(1),
(2) Date: Aug. 24, 2018

(87) PCT Pub. No.: WO2017/144146
PCT Pub. Date: Aug. 31, 2017

(65) Prior Publication Data
US 2019/0039272 A1 Feb. 7, 2019

(30) Foreign Application Priority Data
Feb. 26, 2016 (DE) .......... 10 2016 103 490

(51) Int. Cl.
*B29C 45/14* (2006.01)
*B29D 99/00* (2010.01)
(Continued)

(52) U.S. Cl.
CPC .... *B29C 45/14409* (2013.01); *B29D 99/0053* (2013.01); *B29C 2045/0093* (2013.01);
(Continued)

(58) Field of Classification Search
CPC ...... B29C 45/14409; B29C 2045/0093; B29C 2045/14131; B29C 2793/0009;
(Continued)

(56) References Cited

U.S. PATENT DOCUMENTS 4,902,549 A * 2/1990 Bright .................... F16J 15/027
29/514
5,009,464 A 4/1991 Hasegawa
(Continued)

FOREIGN PATENT DOCUMENTS

DE         9307620 U1    8/1993
DE    102013114775 A1    6/2015
(Continued)

*Primary Examiner* — Lawrence Averick
(74) *Attorney, Agent, or Firm* — Lucas & Mercanti, LLP; Klaus P. Stoffel

(57) ABSTRACT

A method for producing a sealing element for forming a seal on a vehicle body, in particular a vehicle door; in the method, a profiled strip section is subjected to punching, and/or an additional element portion of the sealing element is molded onto a profited strip section. The profiled strip section is provided with a projection that extends transversely to the longitudinal direction of the strip, and the projection is used for positioning the profiled strip section relative to a punching die or injection mold in the longitudinal direction of the strip.

9 Claims, 2 Drawing Sheets

(51) Int. Cl.
  *B29L 31/26* (2006.01)
  *B29C 45/00* (2006.01)
  *B29L 31/30* (2006.01)

(52) U.S. Cl.
  CPC ............... *B29C 2045/14131* (2013.01); *B29C 2793/0009* (2013.01); *B29C 2793/0081* (2013.01); *B29L 2031/26* (2013.01); *B29L 2031/3055* (2013.01)

(58) Field of Classification Search
  CPC ........ B29C 2793/0081; B29D 99/0053; B29L 2031/26; B29L 2031/3055
  See application file for complete search history.

(56) References Cited

U.S. PATENT DOCUMENTS

| | | | | |
|---|---|---|---|---|
| 5,237,741 A | * | 8/1993 | Goedderz | B23P 19/047 29/235 |
| 5,857,572 A | * | 1/1999 | Bird | H05K 13/003 206/713 |
| 6,073,936 A | | 6/2000 | Kirchmann | |
| 6,691,388 B1 | * | 2/2004 | Kuppers | B23P 19/047 29/235 |
| 2002/0025405 A1 | * | 2/2002 | Aritake | B29C 45/14467 428/122 |
| 2003/0218362 A1 | * | 11/2003 | Lee | B60J 7/11 296/210 |
| 2005/0229495 A1 | | 10/2005 | Murase | |
| 2007/0077375 A1 | * | 4/2007 | Honda | C08L 33/10 428/31 |
| 2008/0096003 A1 | * | 4/2008 | Dragon | B29C 66/5346 428/313.5 |
| 2016/0311297 A1 | | 10/2016 | Kast | |
| 2017/0348918 A1 | * | 12/2017 | Barrenscheen | B60R 13/04 |

FOREIGN PATENT DOCUMENTS

| | | |
|---|---|---|
| EP | 0427383 A2 | 5/1991 |
| EP | 3093116 A1 | 11/2016 |

* cited by examiner

METHOD FOR PRODUCING A SEALING ELEMENT

The present application is a 371 of International application PCT/EP2017/000017, filed Jan. 9, 2017, which claims priority of DE 10 2016 103 490.8, filed Feb. 26, 2016, the priority of these applications is hereby claimed and these applications are incorporated herein by reference.

BACKGROUND OF THE INVENTION

The invention pertains to a method for producing a sealing element for forming a seal on a vehicle body, especially on a vehicle door, in which a profiled strip section is subjected to punching and/or an additional element portion of the sealing element is molded onto a profiled strip section.

In the production of sealing elements of this type, especially in the production of composite sealing elements with an extruded profiled strip section onto which additional element portions are molded, the crucial point is to position the profiled strip section as precisely as possible during processing in order to ensure that the sealing element conforms to the specified final dimensions.

SUMMARY OF THE INVENTION

By means of the invention, a method of the above-mentioned type is elaborated in that the profiled strip section is provided with a projection extending transversely to the longitudinal direction of the strip, and in that the projection is used to position the profiled strip section in the longitudinal direction of the strip relative to a punching die or injection mold.

The processing of the strip is preferably accompanied by a reduction in the length of the profiled strip section, in particular by a reduction at the two ends of the strip.

In a further elaboration of the invention, the profiled strip section is placed on a workpiece carrier to position it relative to the punching die, wherein the projection engages in a recess in the workpiece carrier. It is obvious that the projection and the recess are arranged in such a way that the position which the profiled strip section assumes on the workplace carrier is properly adapted to the punching operation.

In particular, the length of the recess in the longitudinal direction of the strip is somewhat greater than the corresponding length of the projection. This makes it possible to ensure that the profiled strip section can be laid on the workpiece carrier without tension.

In a further elaboration of the invention, the projection is arranged a certain distance away, in the longitudinal direction of the strip, from the punching die or injection mold. A positioning projection of this type can also be used advantageously for the precise installation of the sealing element on an installation seat on a vehicle body.

To position the profiled strip section relative to the punching die or injection mold, the distance of the projection in the longitudinal direction of the strip from the punching die or mold in the individual case can be measured, and the predetermined distance can be set by shifting the punching die or mold and/or the profiled section.

A projection of plastic is advisably injection-molded onto the profiled strip section, wherein the injection-molding produces a sufficiently strong, cohesive bond between the projection and the profiled strip section. The projection is advisably configured as a peg.

BRIEF DESCRIPTION OF THE DRAWING

The invention is explained in greater detail below on the basis of an exemplary embodiment and the attached drawings, which pertain to this exemplary embodiment.

DETAILED DESCRIPTION OF THE INVENTION

Figure 3:
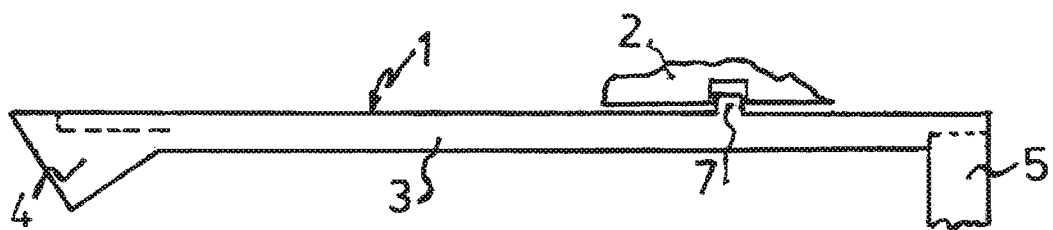
FIG. 3 shows a sealing element produced by the method of FIGS. 1 and 2.

A composite sealing element 1 shown in FIG. 3 for forming a seal on a vehicle door 2, shown partially in FIG. 3, comprises an element portion which is formed by an extruded profiled strip section 3 and element portions 4 and 5 injection-molded onto the profiled strip section 3. The composite sealing element 1 is laid on the vehicle door 2 to form the seal, during which process the profiled strip section 3 is bent.

Figure 1:
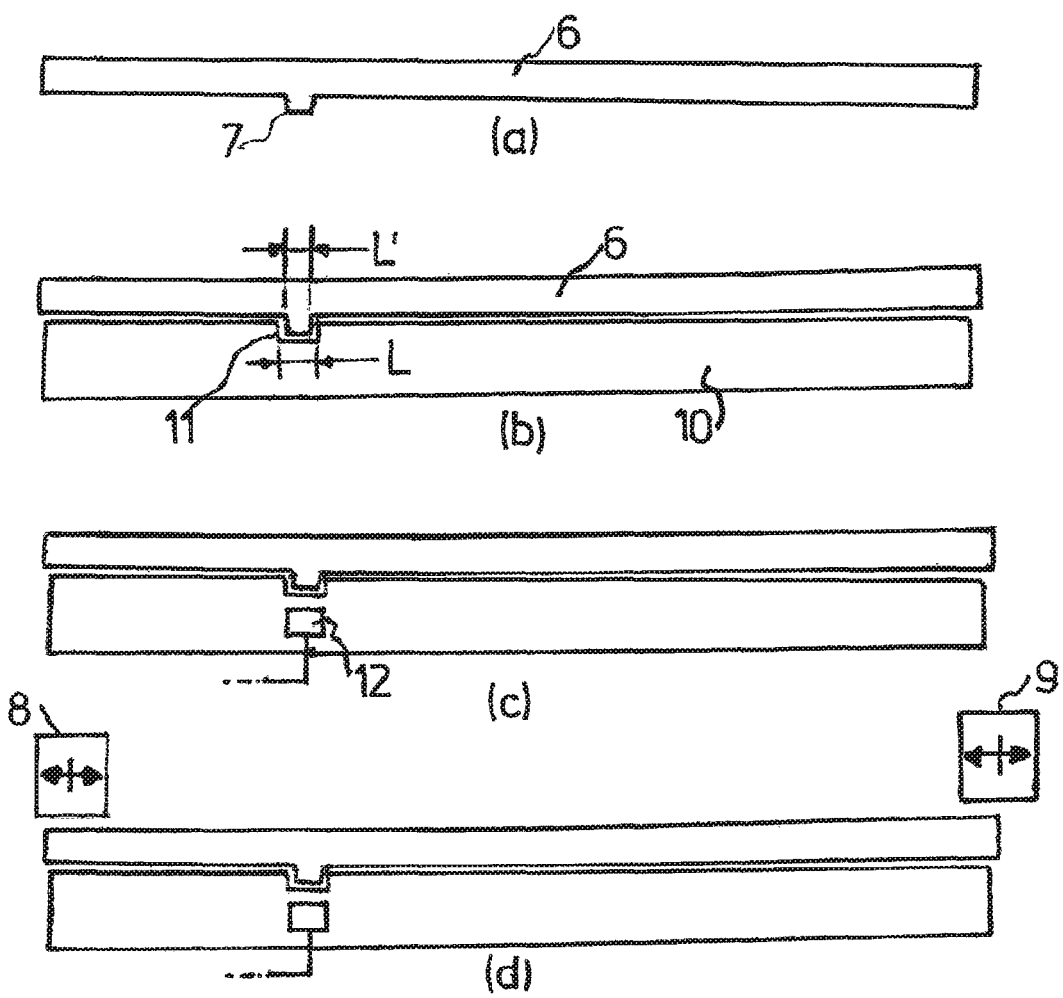
FIG. 1 is a diagram explaining how, according to the invention, a profiled strip is oriented relative to a punching die.

To produce the composite sealing element 1 shown in FIG. 3, a peg-like projecting positioning element 7 is injection-molded onto a preform 6 of the profiled strip section 3, shown in FIG. 1, consisting of elastomeric material. In the example shown here, the positioning element 7 consists of, for example, PP or PE, which, when injection-molded onto the preform 6, forms a cohesive bond with the elastomeric material of the preform 6. In addition to the plastics already mentioned, it would also be possible to use other types of plastic for the positioning element 7 such as HDPE.

So that the element portions 4, 5 can be injection-molded onto the profiled strip section 3, the ends of the preform 6, which has been cut from an endless extruded profiled strip, must first be subjected to a punching operation by punching devices 8 and 9, shown schematically in FIG. 1d. The punching operation is carried out to form punching patterns, indicated by dashed lines in FIG. 3, wherein the preform 6 is shortened by completely cutting offend pieces at both ends.

For the punching operation, as shown in FIG. 1b, the preform 6 with the molded-on positioning element 7 is laid on a workplace carrier 10. The workplace carrier 10 comprises a recess 11, which accepts the positioning projection 7. The length L of the recess 11 in the longitudinal direction of the strip is somewhat greater than the corresponding length L' of the positioning element 7.

The length difference L−L' is large enough that, when the preform 6 is laid on the workpiece carrier 10, the positioning element 7 can engage in the recess 11 without any clamping or tensioning. The length difference L−L' on the other hand, is so small that the preform 6 projects from both ends in the longitudinal direction of the strip beyond the punching devices 8, 9—which makes it possible for the profiled strip section 3 to be punched out from the preform 6—with the least possible excess length of the preform 6 versus the profiled strip section 3 to be punched out from the preform 6.

The distance between the positioning element 7 and the ends of the profiled strip section 3 can be adjusted to satisfy the specified value, in that, according to FIG. 3c, a sensor 12 is used to determine the exact position of the positioning element 7 in the longitudinal direction of the strip, and the position of the punching devices 8, 9 can then be adjusted in accordance with the specified distance as shown in FIG. 1d and adapted to the exact position of the positioning element 7 within the recess 11. It is also possible to use several sensors to detect this position.

As the end result, a punched-out profiled strip section 3 is created, the positioning element of which is located in a predetermined lengthwise position with respect to the ends of the strip.

Figure 2:
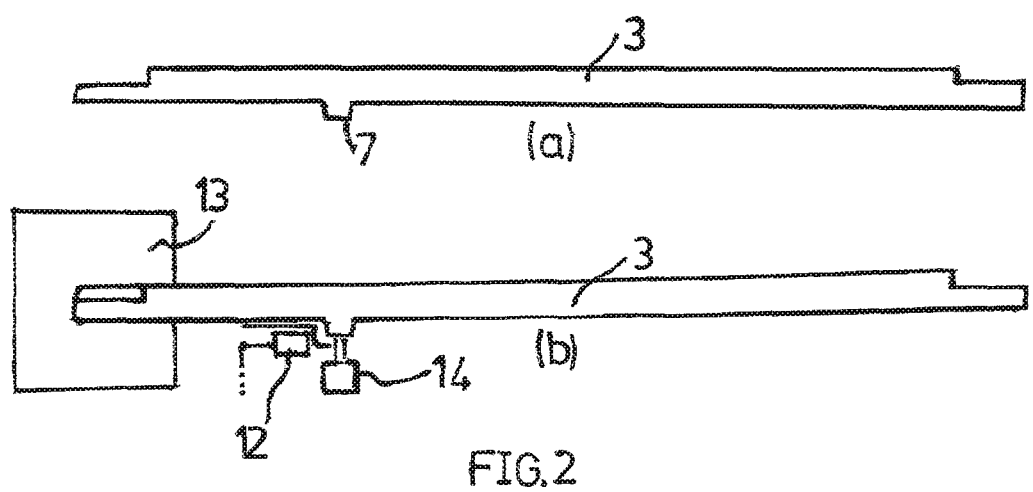
FIG. 2 is a diagram explaining the arrangement according to the invention of a profiled strip relative to an injection mold.

To produce the composite part 1 shown in FIG. 3, the profiled strip section 3 shown by itself in FIG. 2a is bonded to the injection-molded portions 4, 5. According to FIG. 2b, the end of the strip is introduced into an injection mold 13. The required position of the profiled strip 3 with respect to the injection mold 13 is determined by means of, for example, a stop or, in the present case, by a sensor 12, which detects the position of the positioning projection 7. The forward feed of the profiled strip section 3 is stopped automatically when the section reaches the nominal position, and the profiled strip section 3 is held in position in the nominal position by a clamping device 14.

In contrast to the example illustrated here, the clamping device 14 could also act on a different part on the profiled strip section 3 closer to the injection mold 13.

The invention claimed is:

1. A method for producing a sealing element for forming a seal on a vehicle body, comprising the steps of: providing an extruded profiled strip section, which is a primary element portion of the strip element, with a projection extending transversely to a longitudinal direction of the strip and along only a portion of the length of the profiled strip section; subjecting the profiled strip section to a punching operation, including using the projection to position the profiled strip section in the longitudinal direction of the strip relative to a punching die; and injection-molding an additional element portion of the sealing element onto the profiled strip section, including using the projection to position the profiled strip section in the longitudinal direction of the strip relative to an injection mold.

2. The method according to claim 1, wherein the punching operation includes reducing a length of the profiled strip section.

3. The method according to claim 2, wherein the reducing a length of the profiled strip includes a reduction at both ends of the strip.

4. The method according to claim 1, including laying the profiled strip section on a workpiece holder for positioning relative to a punching tool so that the projection engages in a recess in the workpiece carrier.

5. The method according to claim 4, wherein the recess has a length in the longitudinal direction of the strip that is greater than a corresponding length of the projection.

6. The method according to claim 1, wherein the projection is arranged a certain distance away, in the longitudinal direction of the strip, from the punching die or injection mold.

7. The method according to claim 6, wherein, to position the profiled strip section relative to the punching die or injection mold, the distance of the projection from the punching die or injection mold in the longitudinal direction of the strip is measured, and the measured distance is adjusted by shifting the punching die or injection mold and/or by shifting the profiled strip section.

8. The method according to claim 1, wherein the projection is made of plastic and is injection-molded onto the profiled strip section.

9. The method according to claim 8, wherein the projection is peg shaped.

* * * * *